United States Patent [19]

Lindén et al.

[11] Patent Number: 4,865,100

[45] Date of Patent: Sep. 12, 1989

[54] SLEEVE-MOUNTED SPIKE FITTED TO A VEHICLE TIRE

[75] Inventors: Unto Lindén, Hämeenlinna; Erkki Suvanto, Porvoo; Ainetdin Färid, Espoo, all of Finland

[73] Assignee: Neste Oy, Finland

[21] Appl. No.: 187,448

[22] PCT Filed: Sep. 18, 1987

[86] PCT No.: PCT/FI87/00125
§ 371 Date: Apr. 20, 1988
§ 102(e) Date: Apr. 20, 1988

[87] PCT Pub. No.: WO88/01946
PCT Pub. Date: Mar. 24, 1988

[30] Foreign Application Priority Data

Sep. 19, 1986 [FI] Finland .................................. 863803

[51] Int. Cl.⁴ .............................................. B60C 11/16
[52] U.S. Cl. ....................................................... 152/210

[58] Field of Search ..................... 152/210, 211, 209 R

[56] References Cited

U.S. PATENT DOCUMENTS 2,696,864 12/1954 Crooker ............................... 152/210
3,786,849 1/1974 Loqvist ................................ 152/210
3,987,831 10/1976 Walgrave et al. ................... 152/210

Primary Examiner—Michael W. Ball
Assistant Examiner—Gregory J. Wilber
Attorney, Agent, or Firm—Steinberg & Raskin

[57] ABSTRACT

The present invention concerns a sleeve-mounted spike. The sleeve (14) of the substantially symmetric sleeve-mounted spike (10) is provided with an oblique hole (15) for a rivet, the sleeve-mounted spike (10) being arranged, at first contact with the road surface (18), to meet the surface of the road (18) in a substantially upright position.

1 Claim, 1 Drawing Sheet

SLEEVE-MOUNTED SPIKE FITTED TO A VEHICLE TIRE

The present invention concerns a sleeve-mounted spike fitted to a vehicle tire.

Increasing traffic load and spike tires in combination have proved to be a remarkable road attrition factor. In some countries this has even led to prohibition of spike tires, or at least to considerable restrictions.

In Nordic conditions, the beneficial effect of an anti-slip means on the safety and flexibility of traffic has on the other hand been irrefutably demonstrated, and this effect should not be sacrificed: instead, the associated drawbacks should be eliminated. Good results will be achieved by further developing both the road superstructures and the anti-slip tires.

As a pneumatic automobile tyre rolls on an even surface, it is considerably flattened radially, owing to its flexibility, whereby in the contact region longitudinal as well as transversal forces are generated owing to changes of the rolling radius.

The longitudinal forces acting on the spike when the tire is rolling are due to bending of the body structure, to longitudinal slipping and to the stress wave in the rubber.

When a spike approaches the point of contact with the road, the tire body undergoes bending such that the radius of the bent part is significantly smaller than that of equivalent parts of the load-free tire. This deflects the spike, which has been mounted at right angles against the surface, to assume a vertical position before contact with the road. Owing to the protrusion of the spike point, however, the spike is not turned into a fully upright position: it meets the road surface in an oblique position. At this stage, the forces due to slipping tendency also begin to exert their influence.

A further consequence of the oblique angle of encounter is an increased road attrition effect also at the moment when the spike loses contact with the road. Stresses build up around the spike which is urged into the tire in an oblique position, and these are further enhanced, owing to the rotary motion of the tire, during passage over the road contact region, and they cause a scratching effect which is more powerful than that of a straight-aligned spike in an equivalent situation.

Traditionally, the shape of the sleeve-mounted spike has been symmetric and it has been mounted in a hole perpendicular against the wear surface of the tire, whereby it meets the road in a slightly oblique position as the forces mentioned and the protrusion of the spike effect its position. The oblique contact of the spike with the road, as well as its being pushed deeper into the tire in oblique position during the initial part of road contact, cause damage to the rubber and to the spike which impairs the friction properties of the spike, detract from the durability of the spike and increase its road attrition properties.

The aim of the invention is to achieve an improvement in currently known sleeve-mounted spike designs. The more specific aim of the invention is to provide a sleeve-mounted spike in which the drawbacks in designs of the prior art have been avoided.

The aims of the invention are achieved by means of a sleeve-mounted spike which is mainly characterized in that the sleeve of the substantially symmetric sleeve-mounted spike features an oblique hole for the rivet, the sleeve-mounted spike being arranged to meet the road surface, at first contact with the road surface, in a position which is substantially perpendicular.

The invention is described in the following in greater detail by referring to some advantageous embodiments of the invention, presented in the figures of the drawing attached, to which the invention is not meant to be exclusively confined.

BRIEF DESCRIPTION OF THE DRAWINGS

In the embodiment of FIGS. 1 and 2, the sleeve-mounted spike of the invention in general is indicated by reference numeral 10. The sleeve-mounted spike 10 comprises a rivet 11, the flange 12 of the rivet 11, a point part 13 and a sleeve 14. In FIGS. 1 and 2, the rubber of the vehicle tire is indicated by reference numeral 16, the wear surface of the tire by reference numeral 17, and the road surface by reference numeral 18.

Figure 1:
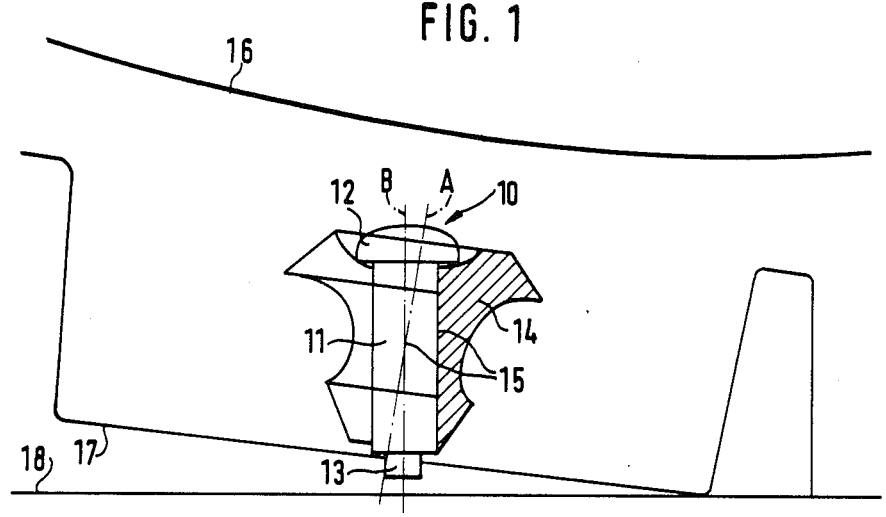
FIG. 1 presents an advantageous embodiment of the sleeve-mounted spike of the invention, in sectional projection.
Figure 2:
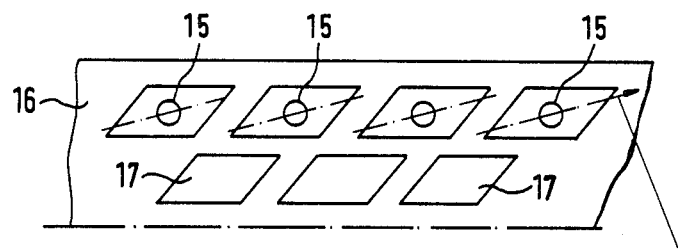
In FIG. 2 is shown part of the tire of a vehicle, viewed from the direction of the wear surface.

As taught by the basic idea of the invention, the sleeve 14 of the sleeve-mounted spike 10 is provided with an oblique hole for the rivet 11, the sleeve-mounted spike 10 being arranged in the initial contact with the road surface 18 to meet the road surface 18 substantially in perpendicular position.

It is important in the encounter of the sleeve-mounted spike 10 and the road surface 18 that the motion of the rivet 11 of the sleeve-mounted spike 10 causing road attrition, and the road contact, will be substantially perpendicular against the road surface 18. In the present invention, this has been so solved in that in the sleeve part 14 of the bipartita sleeve-mounted or equivalent spike 10, a hole 15 is made which is oblique with reference to said part's centre-line A. The straight line running through the oblique hole 15 is indicated by letter B. An oblique hole 15 of this kind guides the road contact of the rivet 11 with the road surface 18 to take place in a substantially nearly perpendicular position when the sleeve 14 has been installed in a position consistent with the slant, in relation to the direction of the wear surface pattern 17 on the tire.

The advantageous slant of the hole 15 is determined by the abovementioned forces caused by the bending of the tire side and by the rotary motion. When said sleeve 14 provided with an oblique hole 15 is installed in a hole substantially perpendicular to the wear surface 17, the sleeve-mounted spike 10 can be tilted in the direction of rotation without changing the perpendicular road contact of the rivet 11. Thus, by the procedure such force components can be made to act on the sleeve-mounted spike 10 which stop the striking movement of the sleeve-mounted spike 10 and turn it into a substantially upright position.

In the foregoing, only one advantageous embodiment of the invention has been described, and it is obvious to a person skilled in the art that numerous modifications thereof are feasible within the scope of the inventive idea presented in the claims attached.

We claim:

1. A sleeve-mounted spike (10), comprising a sleeve (14) in which is mounted a substantially symmetric rivet (11) having a point part (13), said sleeve (14) being provided with a hole (15), oblique with reference to said sleeve's center line (A) axis, for mounting the rivet such that said rivet has an oblique axis (B) with respect to said sleeves center line axis, said sleeve-mounted spike (10) being arranged in a tire in such manner that at first contact with a road surface (18), the point part meets the road surface (18) in a substantially perpendicular position.

* * * * *